Sept. 12, 1967 F. A. ROMANO, JR., ET AL 3,341,657
LIGHT VALVE ALIGNING MEANS COMPRISING STRUCTURAL MEMBERS
FOR MECHANICALLY POSITIONING THE LIGHT VALVE ELEMENTS
Filed Feb. 24, 1965
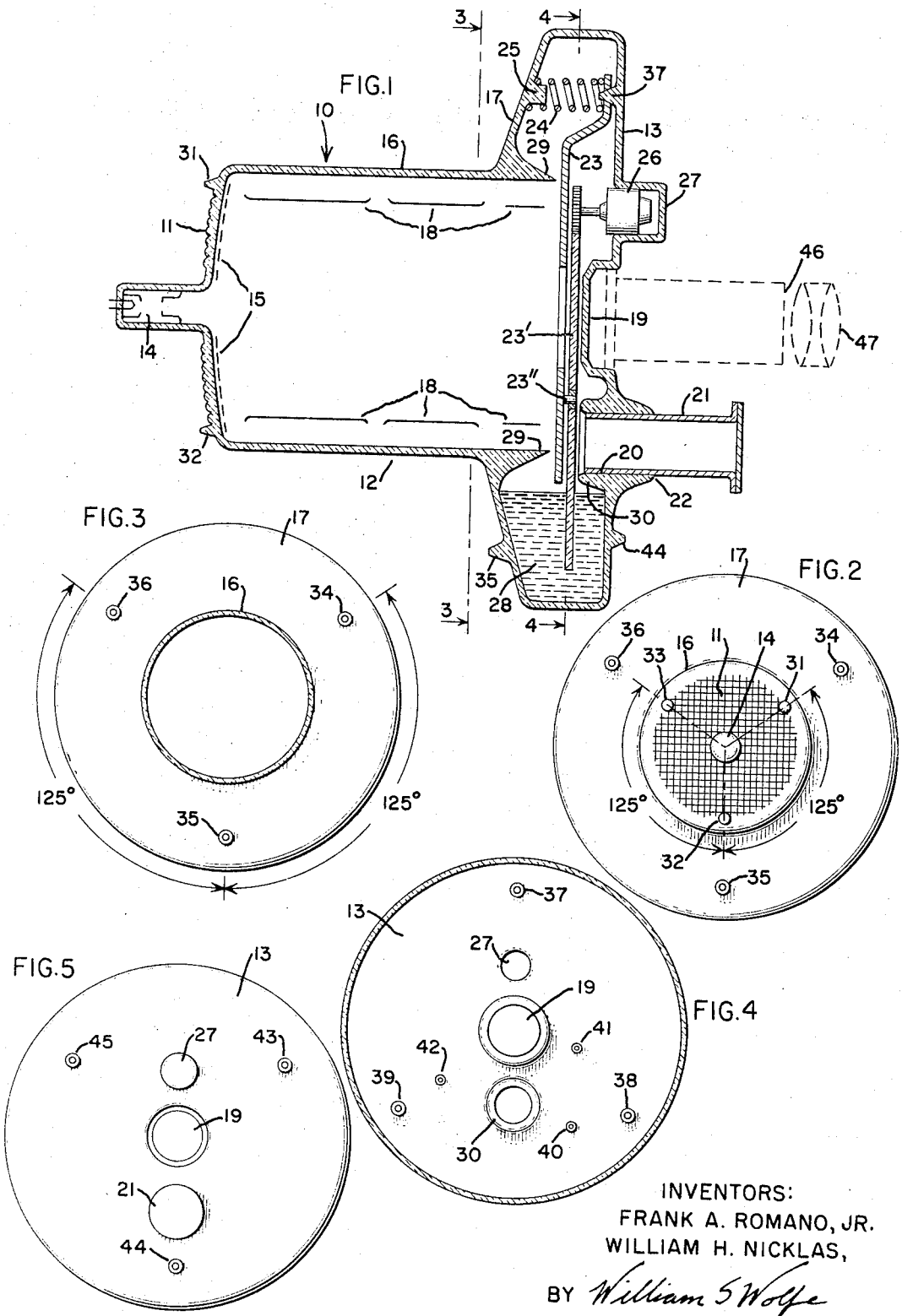
INVENTORS:
FRANK A. ROMANO, JR.
WILLIAM H. NICKLAS,
BY *William S Wolfe*
THEIR ATTORNEY.

United States Patent Office 3,341,657
Patented Sept. 12, 1967

3,341,657
LIGHT VALVE ALIGNING MEANS COMPRISING STRUCTURAL MEMBERS FOR MECHANICALLY POSITIONING THE LIGHT VALVE ELEMENTS
Frank A. Romano, Jr., and William H. Nicklas, Syracuse, N.Y., assignors to General Electric Company, a corporation of New York
Filed Feb. 24, 1965, Ser. No. 434,961
8 Claims. (Cl. 178—7.5)

This invention relates generally to a light valve of the type used in television image projection and, more particularly, to a means for accurately aligning the elements of the light valve and the light valve itself.

One form of a light valve tube suitable for the projection of television images comprises an evacuated envelope in which is positioned an electron gun and a rotatable disc bearing a light modulating fluid. An electron beam generated by the electron gun is scanned across a portion of the light modulating fluid, the beam being controlled to selectively deform the surface of the fluid. The deformations formed in the fluid by the electron beam constitute diffraction gratings which, in conjunction with the light source and a schlieren optical system, serve to selectively control passage of light from the source to a screen in accordance with the image being projected.

In a light valve of the type just described optimum performance can be achieved only when the light source, the schlieren optical system, the electron gun and the electron beam deflection elements are mounted in substantially perfect alignment. In the past the unique problems encountered in achieving the necessary alignment have made the production of light valves in large numbers, at a relatively low cost, impossible. To permit manufacturing of such light valves in sufficient numbers to decrease the unit cost to the point of commercial feasibility, it is necessary to provide a method for overcoming the unique alignment problems by achieving substantially perfect alignment in a relatively simple and inexpensive manner. The present invention provides such a simplified alignment means in order to take advantage of cost reductions that have been achieved for the individual light valve components. Through the use of the present invention the cost of light valve assembly is decreased to the point where the system becomes commercially feasible.

Therefore, it is an object of this invention to provide a means for mounting the elements of a light valve in substantially perfect alignment.

Another object of this invention is to provide a relatively low-cost light valve which also achieves optimum optical performance.

Yet another object of this invention is to provide a light valve wherein accurate alignment of the various elements during assembly is easily and inexpensively effected.

Briefly, in one form of this invention, a simplified aligning procedure is achieved by placing a series of integral positioning devices upon the various sections of the light valve envelope. By proper placement of these positioning devices upon the light valve envelope, all elements within the light valve tube and all elements external to the light valve tube may be aligned with respect to each other and the total system. In addition, the light valve tube itself may be accurately aligned within the projection system. By utilizing these positioning devices the light valve may be assembled quickly, efficiently, economically and with great accuracy thereby overcoming the unique alignment problems which previously existed. The manufacturing of light valves in large numbers at a low cost is one advantage provided by the use of the positioning devices of this invention. An almost equally important advantage is the ease of re-alignment that a repair man in the field will find invaluable in making repairs. Both of these features contribute greatly to the feasibility of making such light valves available in commercial applications.

The novel and distinctive features of this invention are set forth in the appended claims. The invention, together with further objects and advantages thereof, may be better understood by reference to the following description and accompanying drawings in which:

FIGURE 1 is a simplified cross-sectional view of a representative light valve including the positioning devices of this invention, FIGURE 2 is a first end view of the light valve tube depicted in FIGURE 1, the view being taken from the left of FIGURE 1 and illustrating the placement of the positioning devices on the lenticulated input window, FIGURE 3 is a simplified sectional view taken along the line 3—3 of FIGURE 1 to illustrate the placing of the positioning devices on the funnel of the light valve, FIGURE 4 is a simplified sectional view taken along the line 4—4 of FIGURE 1 to illustrate the placing of the positioning devices upon the interior surface of the face plate of the light valve, FIGURE 5 is a second end view of the light valve tube depicted in FIGURE 1, the view being taken from the right of FIGURE 1 and illustrating the placement of the positioning devices upon the exterior surfaces of the face plate of the light valve.

Referring now to FIGURE 1, a light valve 10 is shown. Light valve 10 consists of three main parts; a lenticulated input window 11, a funnel portion 12 and a face plate 13.

The lenticulated input window 11 is provided with a central opening in which is sealed an electron gun assembly 14. The inner surface of the lenticulated input window 11 is coated to provide input bars 15 of a schlieren optical system. The lenticulated input window 11 and its associated elements are connected to the funnel 12 of the light valve.

The funnel 12 is composed of two separate portions, a relatively small diameter portion 16 and a larger diameter portion 17. Located within the relatively small diameter portion 16 of funnel 12 are focus deflection electrodes 18.

The face plate 13 includes an output window 19 and is provided with an opening 20 for coupling a suitable vacuum pump generally shown at 21 to the internal portion of the envelope. The portion of the vacuum pump which extends through opening 20 is sealed to the face plate along the periphery of the opening 20 as indicated at 22 with a material which matches the expansion of the glass envelope 10.

A shield assembly unit 23 is mounted in the portion of the light valve chamber formed by the larger diameter portion 17 and face plate 13. Shield 23 is held in position by a plurality of spaced spring members 24, each spring member engaging integral bosses 25 located on portion 17 of the funnel 12. A single such spring member 24 and the associated boss 25 are shown in FIGURE 1. A raster disc 23' is rotatably mounted on a spindle 23" attached to the shield 23. The disc 23' is driven by a suitable drive means 26 located in a well 27 in face plate 13 and operably engaging the periphery of the disc 23'. As the disc 23' is rotated by drive means 26 it passes through a reservoir of writing fluid 28. A projection 29 on the funnel 12 is designed to prevent the writing fluid from entering the focus deflection system. Similarly, a projection 30 on the face plate is designed to prevent the fluid from entering the vacuum pump.

In order to facilitate accurate assembly of the elements within the funnel portion 12 and to provide accurate positioning of the light valve when assembled with respect to the associated external apparatus, this invention contemplates the provision of integral positioning means on the various surfaces of the light valve. These positioning means will now be described with particular reference to FIGURES 2, 3, 4 and 5.

In the illustrated embodiment of the invention the positioning means are in the form of protuberances having tapered surfaces. As a specific example, the protuberances may take the form of slightly truncated cones. As seen in FIGURE 2, protuberances 31, 32 and 33 are displaced about the lenticulated input window 11. The protuberances may be provided wherever necessary depending upon the design of the window. As an example, in the form of light valve shown, the protuberances 31 and 33 may be displaced 125° from protuberance 32, which means that protuberances 31 and 33 are then only displaced 110° from each other. This guarantees that the lenticular input window will be oriented in the proper position. The protuberances 31, 32 and 33 are arranged for mating with similarly located recesses in the elements of the optical system (not shown) positioned behind the electron gun 14.

Protuberances 31, 32 and 33 perform several functions. First of all, these protuberances aid in aligning the lenticulated input window 11 with the source of light and the optical elements that precede the light valve. Another function of protuberances 31, 32 and 33 is to align the electron gun assembly during the time that it is being mounted to the window 11 in the manufacturing or reassembly process. The input bars 15 of the schlieren system are also positioned by reference to the protuberances 31, 32 and 33.

For some uses, such as aligning the electron gun assembly 14, a jig is utilized to engage the specially positioned protuberances to accurately position the electron gun. During other functions the protuberances will mate with appropriate counterparts to provide support as well as an aligning means. And, finally, for other purposes, such as positioning the input bars 15, the protuberances will serve as reference points.

Turning now to FIGURE 3, it will be seen that in the illustrated embodiment the enlarged diameter portion of the funnel 12 is provided with protuberances 34, 35 and 36. These protuberances are similar to protuberances 31, 32 and 33 and may be referenced with respect thereto. Protuberances 34, 35 and 36 are primarily useful in aligning the complete light valve 10 in the total system, the protuberances 34, 35 and 36 being arranged for mating with suitably located recesses of the total system for this purpose. The protuberances 34, 35 and 36 may also be used for other aligning procedures in the same manner as the protuberances 31, 32 and 33.

To illustrate the use of the positioning elements of the invention for the accurate mounting of the various components of the light valve itself, attention is directed to FIGURES 1 and 4. FIGURE 4 is a view taken along the line 4—4 of FIGURE 1 but omitting for the purposes of simplicity all elements but the face plate 13. In FIGURE 4 it may be seen that the internal surface of face plate 13 is provided with six protuberances, three large protuberances 37, 38 and 39 and three small protuberances 40, 41 and 42. The larger protuberances 37, 38 and 39 are used to position and support the shield assembly 23, the shield 23 having suitable openings therein to receive the protuberances 37, 38 and 39 for this purpose. One aspect of this supporting function may best be seen in FIGURE 1 where protuberance 37 is shown as aligning and supporting shield assembly 23 in conjunction with spring member 24.

The smaller protuberances 40, 41 and 42 are not displaced in the same pattern as are the larger protuberances 37, 38 and 39, but are in a cluster on one-half of the face plate surface. These small protuberances 40, 41 and 42 may be referenced with respect to protuberances 37, 38 and 39, in the same manner as protuberances 37, 38 and 39 are referenced with respect to protuberances 34, 35 and 36 and protuberances 31, 32 and 33. The protuberances 40, 41 and 42 serve the function of positioning the raster disc 23', the disc 23' rotating in abutment with the protuberances 40, 41 and 42.

The outer surface of the face plate 13 and its associated protuberances 43, 44 and 45 are illustrated in FIGURE 5. These protuberances, in much the same manner as protuberances 34, 35 and 36, serve to assist in aligning the entire light valve with respect to the overall system. Protuberances 43, 44 and 45 additionally serve to assist the alignment of the succeeding optical elements, such as the output bar arrangement 46 of the schlieren system and the projecting lens 47. As in the case for all of the protuberances, protuberances 43, 44 and 45 may have tapered surfaces and are arranged to be received by suitably located recesses in the overall system.

It should be realized that this description has been made with respect to one specific embodiment, but that it is not limited to this embodiment or the particular uses described. It will be appreciated that modifications and changes may be made by those skilled in the art without departing from the spirit and scope of the invention. It is not desired to limit this invention to the particular construction shown and described, but to cover all modifications and changes within its spirit and scope by the appended claims.

What is claimed as new and desired to be secured by Letters Patent of the United States is:

1. In a light valve of the type in which the elements of the light valve are enclosed in an envelope, the improvement comprising the placing of positioning means on said envelope whereby said elements may be aligned with each other and with additional elements external to said envelope, and the light valve itself may be aligned with an overall system.

2. A light valve as recited in claim 1 wherein the positioning means are protuberances on the envelope.

3. A light valve as recited in claim 2 wherein the protuberances have tapered surfaces.

4. In a light valve of the type in which the elements of the light valve are enclosed in an envelope, said envelope having an input window, a funnel including a first portion having a relatively small diameter and a second portion having a relatively large diameter, and a face plate; said input window, said funnel and said face plate being provided with protuberances whereby said elements may be aligned with each other and with additional elements external to said envelope, the light valve itself may be aligned with the overall system.

5. A light valve as recited in claim 4 wherein said protuberances have tapered surfaces.

6. A light valve as recited in claim 4 wherein three protuberances are displaced about said input window; three protuberances are displaced about the external surface of said relatively larger diameter portion of said funnel; three large protuberances are displaced about the internal surface of said face plate, and three small protuberances are located on one portion of said internal surface; and three protuberances are displaced about the external surface of said face plate.

7. A light valve as recited in claim 6 wherein said protuberances have tapered surfaces.

8. A light valve apparatus for positioning in an optical system for the projection of an image on a screen, said apparatus comprising:
 (A) an evacuated envelope,
 (B) a reservoir of light modulating fluid positioned within said envelope,
 (C) a rotatable disc positioned within said envelope and arranged for rotation through said reservoir to produce a layer of light modulating fluid upon the surface of said disc,
 (D) cathode means positioned within said envelope and arranged to emit a beam of electrons impingent upon said layer of light modulating fluid to form a diffraction grating thereon for selectively controlling the passage of light through the optical system to the screen in accordance with the image being projected, (E) shield means interposed between said cathode means and said rotatable disc, said shield means having an aperture therein arranged to pass said beam of electrons, (F) said envelope being provided with a plurality of integral outwardly extending protuberances on the outer surface thereof, said outwardly extending protuberances being arranged to cooperate with corresponding recesses in the optical system to accurately position said envelope with respect to the optical system, and (G) said envelope further being provided with a plurality of integral inwardly extending protuberances on the inner surface thereof, said inwardly extending protuberances engaging said rotatable disc and said shield means to accurately position said rotatable disc and said shield means with respect to said envelope.

References Cited

UNITED STATES PATENTS 3,260,798  7/1966  Campbell et al. ____ 178—7.5 X

JOHN W. CALDWELL, *Acting Primary Examiner.*

R. L. RICHARDSON, *Assistant Examiner.*